US012288515B2

United States Patent
Charrat

(10) Patent No.: US 12,288,515 B2
(45) Date of Patent: Apr. 29, 2025

(54) AUXILIARY-CHANNEL-BASED METHOD FOR CAPTURING IMAGES USING A DISPLAY SCREEN

(71) Applicant: Ledger, Paris (FR)

(72) Inventor: Bruno Charrat, Aix en Provence (FR)

(73) Assignee: Ledger, Paris (FR)

( * ) Notice: Subject to any disclaimer, the term of this patent is extended or adjusted under 35 U.S.C. 154(b) by 0 days.

(21) Appl. No.: 18/580,501

(22) PCT Filed: Jul. 21, 2022

(86) PCT No.: PCT/FR2022/051451
§ 371 (c)(1),
(2) Date: Mar. 29, 2024

(87) PCT Pub. No.: WO2023/002130
PCT Pub. Date: Jan. 26, 2023

(65) Prior Publication Data
US 2024/0321194 A1    Sep. 26, 2024

(30) Foreign Application Priority Data

Jul. 21, 2021 (FR) ...................................... 2107865

(51) Int. Cl.
*G09G 3/3208*     (2016.01)
*G06F 3/14*       (2006.01)
(Continued)

(52) U.S. Cl.
CPC ............ *G09G 3/3208* (2013.01); *G06F 3/14* (2013.01); *G06V 40/1318* (2022.01); *G06V 40/1341* (2022.01); *G09G 2330/021* (2013.01)

(58) Field of Classification Search
CPC .. G09G 3/3208; G09G 2330/021; G06F 3/14; G06V 40/1318; G06V 40/1341; G06V 10/141
See application file for complete search history.

(56) References Cited

U.S. PATENT DOCUMENTS 9,207,851 B1      12/2015   Han
2015/0228221 A1*  8/2015    Simon ...................... G09G 3/32
                                                              345/83
(Continued)

OTHER PUBLICATIONS

International Search Report and Written Opinion dated Oct. 21, 2022 issued in PCT Application No. PCT/FR2022/051451, filed Jul. 21, 2022.
(Continued)

*Primary Examiner* — Abhishek Sarma
(74) *Attorney, Agent, or Firm* — Workman Nydegger

(57) ABSTRACT

A method for generating an image signal of an object by way of a display device including a display screen including light-emitting diodes arranged in rows and columns, the method including displaying a series of images each representing one respective pattern leading to the emission of a light beam that may be identical or different to the preceding light beam depending on whether the displayed pattern is identical or different to the pattern of the preceding image, acquiring a plurality of measurements of the power consumption of the display device during the display of each image while each light beam scans a surface of the object, acquiring a plurality of measurements of the variations in the power consumption of the display device and delivering an image signal of the object.

15 Claims, 7 Drawing Sheets

(51) Int. Cl.
*G06V 40/12* (2022.01)
*G06V 40/13* (2022.01)

(56) References Cited

U.S. PATENT DOCUMENTS

2018/0157351 A1\* 6/2018 Lee .......................... G06F 3/042
2020/0258448 A1   8/2020 Hargreaves

OTHER PUBLICATIONS

E. Vannacci et al., *Applications of Light Emitting Diodes as Sensors of Their Own Emitted Light*, Opto-Electronics Review, vol. 27, No. 4, 2019, pp. 355-362.

\* cited by examiner

AUXILIARY-CHANNEL-BASED METHOD FOR CAPTURING IMAGES USING A DISPLAY SCREEN

BACKGROUND OF THE INVENTION

1. The Field of the Invention

The present invention relates to a method for capturing images and in particular a fingerprint on an apparatus having an image display device including an LED (Light-Emitting Diode) display screen.

2. The Relevant Technology

Most apparatuses that include a display device and are provided with a fingerprint capture functionality include a dedicated component for capturing fingerprints. Providing such a component increases the cost of the apparatus, so that this functionality is generally reserved for premium appliances.

LED, OLED ("Organic LED") or AMOLED ("Active-Matrix OLED") display screens are commonly used in numerous appliances for displaying text, images, and videos. Such screens are made up of LEDs arranged in rows and columns, and controlled for example row-by-row in a time-multiplexed manner. Every time a row is selected, column controllers are activated and deactivated selectively and simultaneously to activate the LEDs located at the intersections of the selected row and the columns, depending on the pixels of an image to be displayed. In a color screen, each of the pixels of an image can be formed by several LEDs of different colors. It should be noted that the columns are not necessarily perpendicular to the rows of the display screen.

Most LEDs can also function as photodiodes. Thus, U.S. Pat. Nos. 7,598,949 and 9,632,344 have suggested using this functionality by describing an LED display screen suitable for capturing especially a fingerprint of a finger placed on the display screen. However, the implementation of this functionality involves additional circuits, and especially one acquisition circuit per line of LEDs of the display screen, to acquire signals relative to the light captured by a line of LEDs, and one circuit for controlling the acquisition circuits and processing the signals that they produce. The addition of an image capture functionality therefore requires a significant modification of the internal architecture of the display device, adding wiring and additional circuits.

The document "Applications of light emitting diodes as sensors of their own emitted light", VANNACCI E. ET AL, OPTO-ELECTRONICS REVIEW, vol. 27, no. 4, Dec. 1, 2019 (2019 Dec. 1) pages 355-362, indicates that a light-emitting diode (LED) can be used as a light sensor, and that its emitted light spectrum and its sensitivity spectrum can partially overlap. The document teaches that commercial LEDs can be used as light emitters and simultaneously as sensors of the reflected portion of the light that they themselves emit. For use in a light sensor, the document suggests setting one electrical parameter of the diode and measuring another electrical parameter, for example setting the consumed current and measuring the voltage variations at its terminals, or setting the voltage applied to the LED and measuring the variations in the current flowing through same.

This method requires means for testing the current or voltage at the terminals of an individual LED. However, without modification, a conventional LED matrix generally only allows overall testing of the current consumed by all the activated LEDs of a selected row.

SUMMARY OF THE INVENTION

It is therefore desirable to produce an LED display device having an image capture functionality, such as for capturing a fingerprint, without having to modify the architecture of the display device, and a method making it possible to use the property of the aforementioned LEDs, to be both photoemitter and photodetector, without adding particular measurement means to the internal structure of the display device.

In order to obtain an image signal of an object placed on a display screen comprising an LED matrix, the present invention proposes a method for analyzing variations in the overall power consumption at the terminals of the LED matrix, from a measurement of current, voltage, or another representative quantity, such as electromagnetic radiation. This method is similar to the auxiliary-channel-based methods for analyzing power consumption, making it possible to discover the value of a secret key while an integrated circuit performs a cryptographic computation, by observing fluctuations in the voltage or current at the terminals thereof, or in the electromagnetic radiation that it emits. The analysis of the variations in power consumption is synchronized with the scanning of the pixels of the LED matrix, and makes it possible to deduce the position and the shape of the object placed on the display screen.

More particularly, some embodiments of the invention relate to a method for generating an image signal of an object by means of a display device including a display screen comprising light-emitting diodes arranged in rows and columns, the method comprising steps consisting in: by means of the display screen, displaying a series of images each representing one respective pattern, the display of each pattern causing the activation of at least one LED of the display device and leading to the emission of a light beam that may be identical or different to the preceding light beam depending on whether the displayed pattern is identical or different to the pattern of the preceding image; acquiring a plurality of measurements of the power consumption of the display device during the display of each image; acquiring a plurality of measurements of variations in the power consumption of the display device, each measurement of a variation in the power consumption being representative of a divergence between a measurement of the power consumption of the display device during the display of an image and a measurement of the power consumption of the display device during the display of a preceding image of the series of images, the measurements of the power consumption of the display device being synchronized with the successive selection of LEDs during the display of each image of the series of images.

According to one embodiment, the acquisition of each measurement of the power consumption of the display device during the display of an image comprises the acquisition of a plurality of measurements of power consumption by displaying the same image several times, and the acquisition of the plurality of measurements of the variations in the power consumption is carried out by mathematical computation or artificial intelligence based on the plurality of measurements of power consumption obtained for each image displayed several times.

According to one embodiment, each image of the series of images represents the same pattern or, in an equivalent manner, the series of images comprises only one image, the light beam being invariable, comprising the step that consists in scanning the surface of the object by moving the object with respect to the light beam.

According to one embodiment, the display of each image comprises the successive selection of groups of LEDs each comprising at least one LED, and the measurement of the variations in the power consumption of the device is obtained by comparing its power consumption when one group of LEDs is selected for a first position of the object, with its power consumption when the same group of LEDs is selected for subsequent positions of the moving object, and this for each group of LEDs selected when an image is displayed.

According to one embodiment, each image of the series of images represents a different pattern, in order to vary the light beam, the object being stationary with respect to the display device.

According to one embodiment, the display of each image and of a pattern assigned to the image comprises the successive selection of groups of LEDs each comprising at least one LED, and the measurement of the variations in the power consumption of the device is obtained by comparing its power consumption when each group of LEDs is selected during the display of an image, with its power consumption when another group of LEDs is selected during the display of a preceding image, and so on for each subsequent image, the selected groups of LEDs for which the variations in the power consumption of the device are measured from one image to another being groups of the same rank according to a predetermined order of LED selection when each image is displayed.

According to one embodiment, the series of images represents the same pattern or, in an equivalent manner, the series of images comprises only one image, the generation of the image signal of the object comprises steps that consist in determining divergences in power consumption by subtracting from each measurement of power consumption a respective reference measurement acquired in the absence of an object in the light beam, and the measurement of the variations in the power consumption of the device is obtained by comparing its power consumption when one group of LEDs is selected in the presence of the object, with its power consumption when the same group of LEDs is selected in the absence of the object.

According to one embodiment, the object is a fingerprint profile.

According to one embodiment, the object is a fingerprint and the display of each image and of a pattern assigned to the image comprises the successive selection of groups of LEDs each comprising at least one LED, each image of the series of images represents the same pattern or, in an equivalent manner, the series of images comprises only one image, the method comprising a step of storing in memory the power consumption of the display screen when each group of LEDs is activated in the presence of the fingerprint of an authentic user, and then a step of comparing with the power consumption stored in memory the power consumption of the display screen when each group of LEDs is activated in the presence of a fingerprint to be authenticated.

According to one embodiment, the measurements of signals representative of variations in the power consumption of the display device are acquired according to either one of the following methods or a combination thereof: by measuring an electrical supply voltage of the display device; by measuring an intensity of a supply current of the display device; by measuring an intensity of a current transiting through a ground connection of the display device; by measuring an electromagnetic radiation emitted by the display device or the display screen.

According to one embodiment, the images of the series of images are displayed row-by-row of LEDs, the LEDs of one row being activated simultaneously to display a row of images, the method comprising steps that consist in measuring the variations in the power consumption of the display device for each row of an image of the series of images displayed, using a synchronization signal transmitted at the start of the display of each image of the series of images, or upon detecting a particular pattern in the acquired signal measurements, the particular pattern being located in a defined position in each image of the series of images.

According to one embodiment, the acquisition of the measurements of signals of variation in power consumption of the display device is limited to a set of LEDs corresponding to only one portion of the screen.

According to one embodiment, the method comprises a step of selecting a color of an LED to display the pattern or patterns of the series of images.

Some embodiments also relate to an apparatus comprising a display device, a processor connected to the display device, and a member for acquiring measurements of signals representative of the power consumption of the display device, the acquisition member being connected to the processor, the processor being configured to implement the method described hereinbefore.

According to one embodiment, the member for acquiring measurements of signals representative of power consumption comprises at least one of the following means: a link connected to a power supply terminal of the display device and to an input of an amplifier, a resistor mounted in series on a supply link connected to the power supply terminal of the display device, and a differential amplifier connected to the terminals of the resistor, a resistor inserted between a terminal for connecting the display device to a ground of the apparatus and the ground of the apparatus, and an amplifier connected to the ground connection terminal, an electromagnetic probe placed in the vicinity of an LED matrix of the display device, the probe being connected to a differential amplifier.

BRIEF DESCRIPTION OF THE DRAWINGS

Exemplary embodiments of the invention will be described in what follows, by way of non-limiting example in relation to the accompanying figures, among which.

DETAILED DESCRIPTION OF THE PREFERRED EMBODIMENTS

Figure 1:
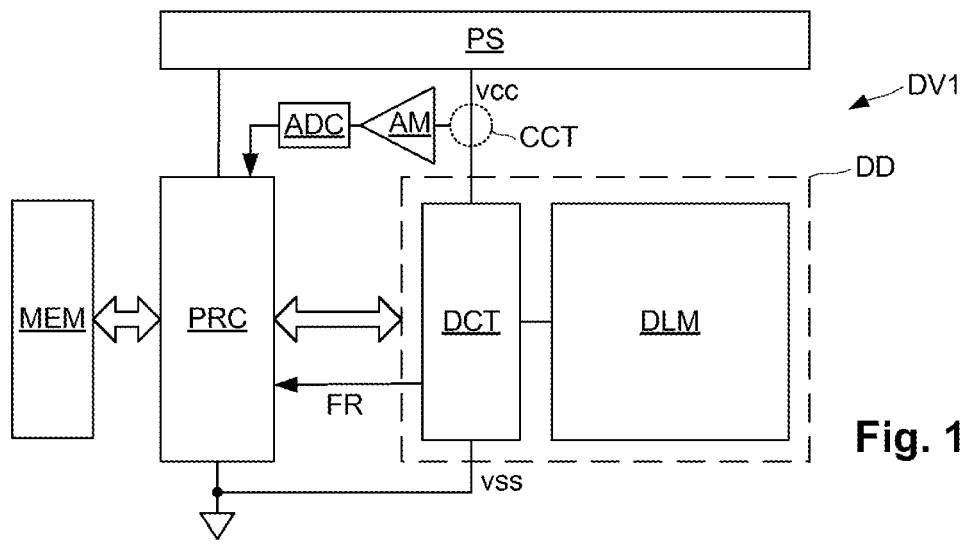
FIG. 1 schematically depicts an apparatus including a display device and a member for measuring the power consumption of the display device, according to one embodiment, FIGS. 2, 3 and 4 schematically depict exemplary embodiments of apparatuses including a display device and a member for measuring a signal representative of the power consumption of the display device, FIG. 5 schematically depicts a group of light-emitting zones of a conventional LED-type display screen.

FIG. 1 depicts an apparatus DV1 according to a first embodiment making it possible to implement the method according to the invention. The apparatus DV1 comprises a processor PRC, for example of the microprocessor or microcontroller type, memories MEM including an image memory, a display device DD and a supply circuit PS supplying the processor PRC and the display device DD. The display device DD comprise DCT control circuits and a display matrix DLM including a multiplicity of light-emitting zones arranged in rows and in columns that are optionally perpendicular to the rows. The matrix DLM is for example of the LED, OLED or AMOLED type and forms a display screen with a transparent plate attached to the matrix. The DCT control circuits comprise a power supply terminal receiving a voltage VCC supplied by the supply circuit PS and a terminal VSS connected to the ground of the apparatus DV1. The DCT control circuits deliver to the processor PRC a synchronization signal FR indicating the start time of the display of each image or of each image frame by the pixel matrix DLM.

According to one embodiment, the apparatus DV1 comprises a capture circuit CCT for capturing a consumption signal representative of the instantaneous overall power consumption of the display device DD, an amplifier AM for amplifying the overall consumption signal delivered by the circuit CCT and an analog-to-digital converter ADC for converting the amplified overall consumption signal into digital data which are delivered to the processor PRC. According to one embodiment, the capture circuit CCT can simply be an electrical link between the input of the amplifier AM and the link transmitting the voltage VCC between the supply circuit and the DCT control circuits of the display device DD.

The processor PRC is configured to use the digitized overall consumption signal in order to form an image of an object placed on the display screen of the display device DD or held in the vicinity of the latter, or a signal representative of an image of the object.

It should be noted that the processor PRC may include an internal analog-to-digital converter accessible via an analog input of the processor. In this case, it is not necessary to provide the converter ADC. The amplifier AM may also be unnecessary according to the type of converter used. The consumption signal delivered by the capture circuit CCT can also be used directly without it being necessary to provide an amplifier and/or an analog-to-digital converter.

Figure 2:
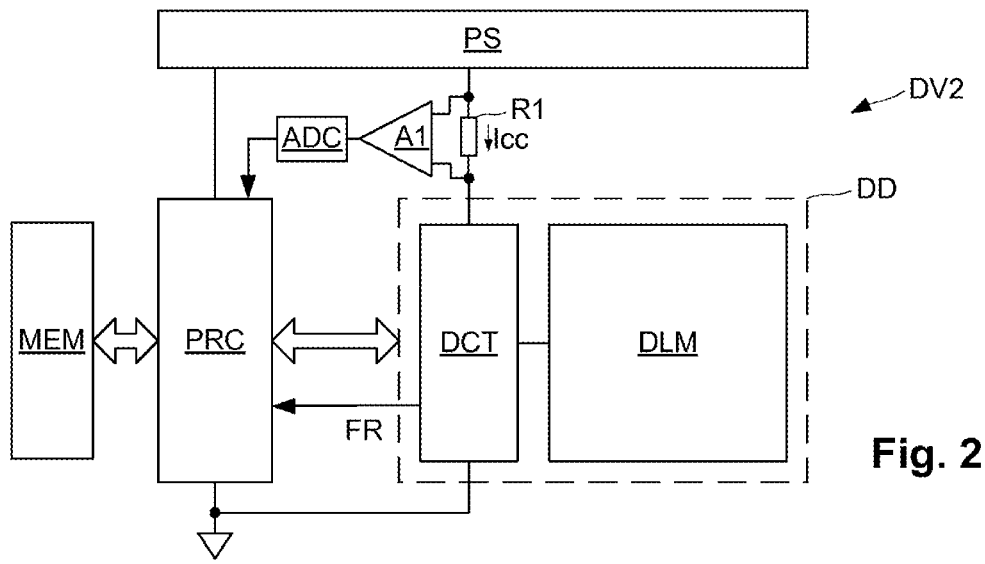

FIG. 2 depicts an apparatus DV2 according to a second embodiment making it possible to implement the method according to the invention, the apparatus DV2 including a capture circuit according to a second embodiment. The capture circuit herein comprises a resistor R1 mounted in series between the supply circuit PS and the input terminal of the voltage VCC of the DCT control circuits of the pixel matrix DLM. The two terminals of the resistor R1 are respectively connected to two inputs of a differential amplifier A1, the output of which is connected to the input of the converter ADC or to an analog input of the processor PRC leading to a converter ADC internal to the processor.

Figure 3:
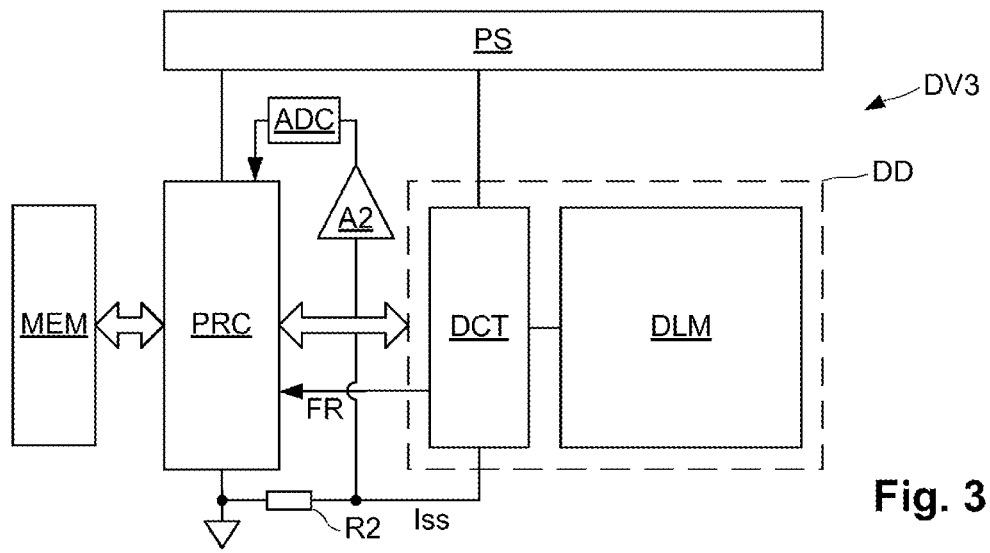

FIG. 3 depicts an apparatus DV3 including a capture circuit according to a third embodiment, also making it possible to implement the method according to the invention. The capture circuit comprises a resistor R2 mounted in series between the ground and the ground connection terminal of the DCT control circuits. The ground connection terminal of the DCT control circuits is connected to the input of an amplifier A2, the output of which is connected to the input of the converter ADC or to an analog input of the processor PRC leading to a converter ADC internal to the processor.

Figure 4:
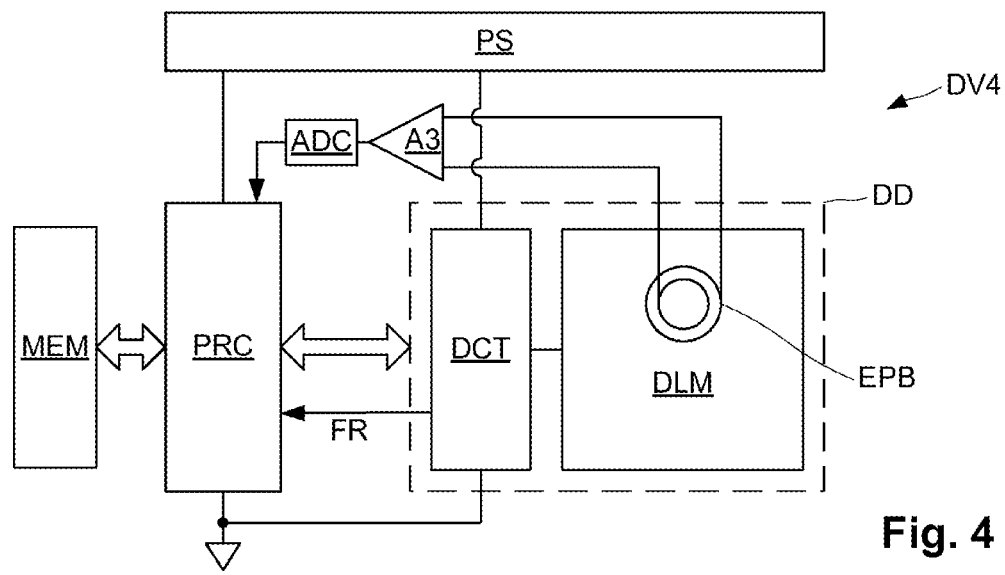

FIG. 4 depicts an apparatus DV3 including a capture circuit according to a fourth embodiment, also making it possible to implement the method according to the invention. The capture circuit comprises an electromagnetic probe EPB coupled to the pixel matrix DLM so as to deliver a signal representative of the instantaneous overall power consumption of the display matrix DLM. The probe EPB includes two output terminals connected to respective inputs of a differential amplifier A3 including an output connected to the input of the converter ADC.

Figure 5:
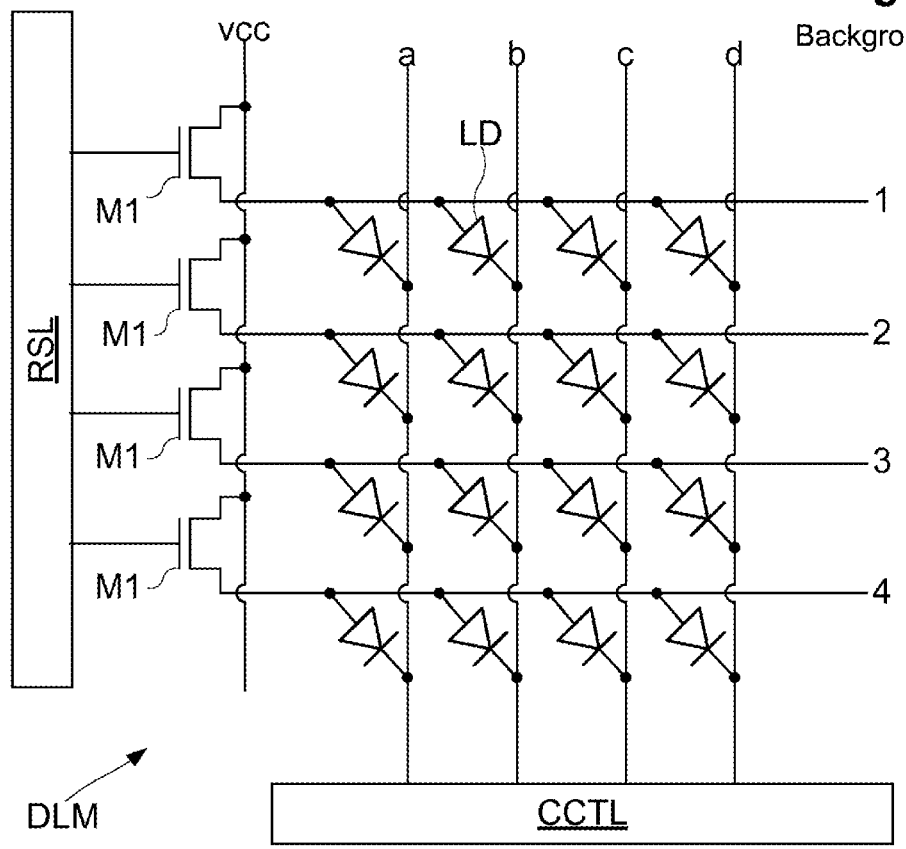

FIG. 5 depicts a group of LEDs of a conventional LED-type display matrix DLM. For the sake of clarity, only one group of four rows (numbered 1 to 4) of four LEDs LD distributed in four columns (numbered a to d) is depicted. In each row 1 to 4, the anode of each LED LD is connected to a conducting terminal of an N-channel MOS transistor M1 having a second conducting terminal receiving the supply voltage VCC. The transistor M1 of each row comprises a gate terminal connected to a respective output of a row decoding circuit RSL. In each column a to d, the cathode of each LED LD is connected to a column link connected to a column control circuit CCTL.

An LED LD is switched on by controlling the transistor M1 of the corresponding row to make it conductive and by connecting the corresponding column to the ground. Thus, each LED forms a light-emitting zone capable of being switched on or off individually.

To display one row of an image stored in the image memory MEM, the image row is loaded into the column control circuit CCTL, the latter keeping columns a-d in the high-impedance state. The decoding circuit RSL activates the row to be displayed. The anode of the LEDs of the activated row is therefore at the voltage VCC. Depending on the image data of the loaded row, the control circuit CCTL applies to each column a-d a low voltage or else the voltage VCC depending on whether the LED at the intersection of the row and the column must be switched on or remain off. The column connections of the LEDs that must be switched off may also be kept at high impedance. The control circuit CCTL applies to a column a zero voltage (ground potential) when the corresponding LED must emit a maximum light intensity, so that the current passing through it is maximum.

Figure 6A:
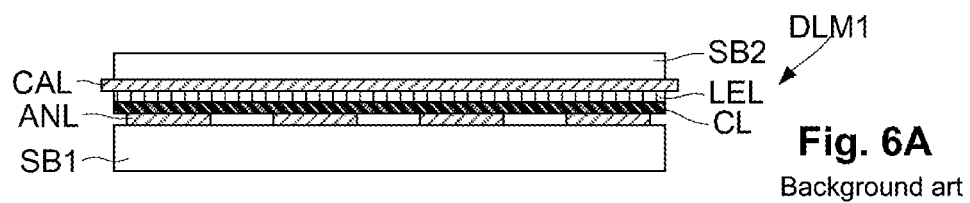
FIG. 6A and FIG. 6B are schematic views, in section and in top view, respectively, of a group of pixels of a conventional OLED display screen, FIG. 7 schematically depicts a group of pixels of the display device.
Figure 6B:
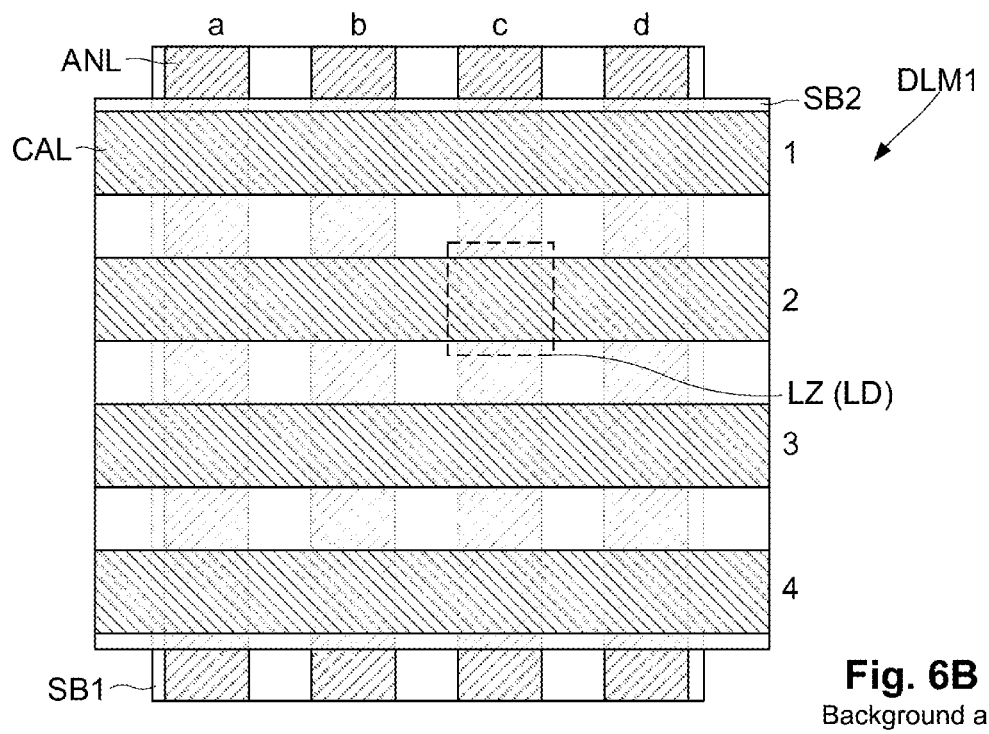

FIGS. 6A and 6B depict an OLED-type display matrix DLM1. The matrix DLM1 has a multilayer structure comprising a substrate SB1 on which parallel conductive traces ANL forming rows of LED anodes are formed. The traces ANL are covered with a conductive layer CL, and then a light-emitting layer LEL, these two layers being made of suitable polymers or organic molecules. The layer LEL is covered with parallel and transparent conductive traces CAL, forming rows of LED cathodes, arranged perpendicularly to the anode traces ANL. Each region wherein a trace ANL is superimposed on a trace CNL thus forms an LED or light-emitting zone LZ capable of being switched on or off individually. The layer LEL is covered with a transparent protective screen SB2.

The matrices DLM, DLM1 of FIGS. 5, 6A and 6B are controlled row-by-row so that all the LEDs of one row are controlled simultaneously to optionally switch on each of the LEDs of the row selectively. Thus, an image is displayed or refreshed progressively row-by-row. In what follows, the term "row" refers to a line of LEDs or light-emitting zones that are selected simultaneously, and the term "column" refers to a line of LEDs belonging to different rows and which are therefore selected successively when an image is displayed by the matrix.

Figure 7:
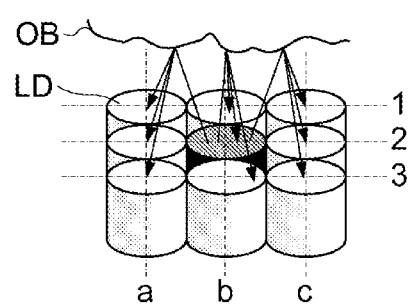

FIG. 7 depicts a group of nine adjacent LEDs LD of the pixel matrix DLM or DLM1, distributed over three rows numbered 1, 2 and 3 and three columns numbered a, b and c. In the example of FIG. 7, only LED 2-b (row 2, column b) emits light and the LEDs adjacent to LED 2-b are off. If an object OB is present on the surface of the display screen, each of the LEDs LD, including the switched-on LED 2-b receives part of the light emitted by LED 2-b and reflected by the surface of the object OB opposite the display screen. Among the switched-off LEDs, it is possible to distinguish between

- those connected to LED 2-b, that is to say LEDs 2-a and 2-c located on row 2 of LED 2-b, and LEDs 1-b and 3-b located on column b of LED 2-b,
- and the LEDs not connected to LED 2-b, that is to say those located on floating rows 1 and 3 and columns a and c which are also floating (without which LEDs 2-a and 2-c would be switched on), that is to say, LEDs 1-a, 3-a, 1-c, and 3-c.

The reflection of the light towards connected LEDs 2-a to 2-c, 1-b and 3-b, including switched-on LED 2-b has the effect of modifying the power consumption of the matrix DLM, DLM1 while LED 2-b is switched on. The reflection of the light towards non-connected LEDs 1-a, 1-c, 3-a, 3-c has the effect of accumulating electrical charges in these rows and columns, and these electrical charges will be discharged when rows 1 and 3 are activated. Additionally, it goes without saying that the further the object is from the surface of the display screen, the less it reflects light toward the latter. The amount of light reflected toward the display screen also depends on the color of the object and the wavelengths emitted by the LEDs. Thus, the lighter the object is in the wavelength range considered, the more light it reflects toward the display screen.

The processor PRC is configured to use the measurements of consumed voltage or current or of electromagnetic signal emitted by the display device DD, in order to determine the amplitude of the light reflection on each row of the matrix DLM when an object is presented in the vicinity of and above the display screen. According to the method of the invention, the amplitude of the light reflection can be determined by comparison with consumption measurements obtained in the absence of an object in the vicinity of the display screen when a predetermined pattern is displayed by the display screen. The measurements obtained in the absence of an object are then acquired and stored in memory by the processor PRC during a calibration phase. The calibration phase can be executed at various times, and especially just before a phase of detecting or capturing an image of an object present on the display screen.

According to another embodiment, a voltage-to-frequency converter is used instead of the converter ADC. FFT (Fast Fourier Transform) processing can then be applied to separate the high and low frequencies, in order to obtain a measurement of the consumption of the matrix DLM, DLM1.

The processor PRC receives the image synchronization signal FR in order to be able to determine, at any instant, to which image and to which row of the displayed image the digitized consumption signal that it receives from the converter ADC corresponds, the images being displayed row-by-row. The consumption signal is then analyzed row-by-row, the consumption of each row when an image is displayed being compared with the consumption of the same row when the subsequent images are displayed. This will be better understood with reference to FIGS. 8A and 8D, which schematically illustrate an exemplary embodiment of the method wherein the object to be detected is stationary.

FIGS. 8A, 8B, 8C, and 8D depict a series of capture images In, In+1, In+2, In+3, displayed during the acquisition of consumption signals, and examples of curves C1, C2, C3, C4 of consumption signals obtained by displaying the series of images In to In+3. Each image In to In+3 herein has a simple pattern including a column of switched-on LEDs LD, which is shifted by one column to the left in each subsequent image. The signal curves C1 to C4 are presented in FIGS. 8A to 8D in correlation with images In to In+3. For the sake of clarity and simplicity, only one matrix of 4×4 LEDs LD including four rows numbered 1 to 4 and four columns a, b, c, d is shown in FIGS. 8A to 8D. In this example, a single LED 3-b (that is to say, row 3, column b) is entirely covered by an object OB, but the object protrudes substantially over LEDs 3-a, 3-c, 2-b, and 4-b. The object is for example a portion of a fingerprint.

The images are displayed row-by-row. All the LEDs of the displayed row are selected simultaneously by a row controller which applies the voltage VCC to the row, while the configuration of the LEDs in the electrically powered state, thus emitting light, or the non-electrically powered state, is carried out by means of column controllers which are selected simultaneously. The LEDs connected to a column controller in the high-impedance state are in the non-electrically powered state, while the LEDs connected to a column controller in the conducting state (connection of the column to the ground potential) are in the electrically powered state, thus emitting light.

Curves C1 to C4 show the variations in the supply voltage VCC as a function of time, acquired by the processor PRC in the apparatus of FIG. 1, when the display matrix DLM is of the LED type like the one depicted in FIG. 5. Curves C1 to C4 correspond to a measurement of the voltage VCC acquired during the display of images In to In+3, respectively.

Each of the curves C1-C4 comprises four sections L1 to L4. Section L1 shows the value of the supply voltage VCC when row 1 is displayed, section L2 shows the value of the supply voltage VCC when row 2 is displayed, section L3 shows the value of the supply voltage VCC when row 3 is displayed and section L4 shows the value of the supply voltage VCC when row 4 is displayed.

Unlike the teaching of the above-mentioned document "Applications of light emitting diodes as sensors of their own emitted light", these different values of the voltage VCC are acquired without imposing a fixed current in the pixel matrix, the method only addressing overall variations in the power consumption at the terminals of the matrix. Likewise, information relating to the variation in power consumption may be acquired by acquiring the consumed current, without imposing a fixed voltage VCC, or by acquiring an electromagnetic emission signal, without imposing a fixed current or a fixed voltage VCC.

A distinction is made herein between "normal" variations in the voltage VCC and "significant" variations in the voltage VCC due to the presence of the object OB. Normal variations are those which are due to a capacitive effect in the display matrix, having the consequence that with each activation of a subsequent row comprising a switched-on LED, the voltage VCC does not have time to return to its initial value. This phenomenon is observed when a certain number of rows are activated, before the voltage VCC stabilizes (not shown here, the number of rows depicted being insufficient for obtaining this stabilization). This phenomenon is observed on the majority of the LED matrices that are not equipped with a system for discharging stray capacitances, allowing the voltage VCC to return to its initial value before each activation of a new row. The example which is given herein on curves C1 to C4 is therefore based on real observations made on an LED matrix which does not have means for discharging its stray capacitances after each activation of a row.

Figures 8A, 8B, 8C, 8D:
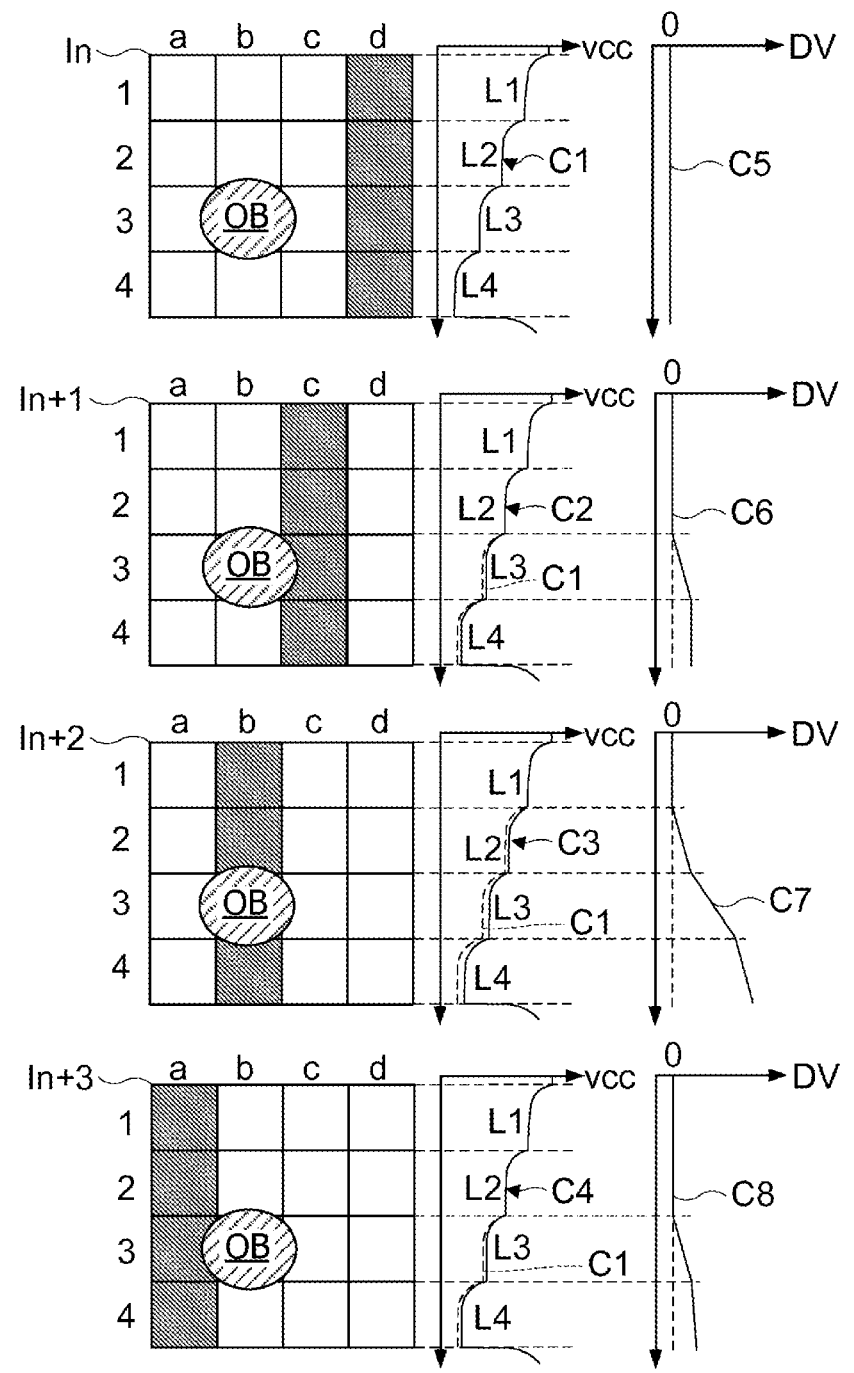
FIGS. 8A, 8B, 8C and 8D depict a group of pixels of the display device at different instants, in correlation with a signal representative of the power consumption of the display device.

Significant variations in the voltage VCC are those which are added to normal variations and which are representative of the presence of the object OB. The method of the invention addresses significant variations and not normal variations. For example, in FIG. 8B corresponding to the display of image In+1, section L3 of curve C2 corresponding to the activation of row 3 shows a divergence of the voltage VCC with respect to the value that it has in section L2 of curve C2 corresponding to the activation of row 2. This divergence is due to a normal variation in the voltage VCC as well as to a significant variation. The normal variation is due to the fact that one LED is activated in row 3, herein LED 3-c, after having activated one LED in row 2, namely LED 2-c. The significant variation is due to the fact that the object OB protrudes substantially over LED 3-c, and reflects a portion of the light that this LED emits, so that the current consumption of the matrix is found to be very slightly altered. Here, the current consumption is substantially lower. This results in a slight increase in the voltage VCC with respect to its normal drop which should have been observed, as shown in FIG. 8B by depicting curve C1 as a dotted line, which is substantially below curve C2 after section L3, or when row 3 is displayed.

It is noted herein that the effect of light reflection by the object OB on the display matrix may also, depending on the structure of the image matrix and the technology used, result in an additional drop in the voltage VCC and not in a reduction of the drop in the voltage VCC as shown herein. Generally, the method of the invention addresses significant variations, whether these are positive or negative.

FIGS. 8A-8D also show curves C5 to C8 showing the significant variations in the supply voltage VCC with each scan of a row, for each image displayed.

When the measurements forming curve C1 are acquired, column d of LEDs LD is progressively switched on from row 1 to row 4. The light emitted by column d is almost not reflected toward the display screen by the object OB in position 3-b. The result is that the significant variations in the voltage VCC remain substantially zero, curve C5 being flat.

When the measurements of curve C2 are acquired, column c comprising LEDs 1-c to 4-c is switched on. The light emitted by column c is slightly reflected by the object OB toward the display screen because the object protrudes substantially over LED 3-c, as noted above. As a result, curve C2 of the voltage VCC has a slight significant divergence with respect to curve C1 when rows 3 and 4 are activated, which corresponds to sections L3 and L4 of curve C2. This significant variation is found on curve C6 which increases during the display of row 3 and this increase is maintained during the display of row 4.

When the measurements of curve C3, corresponding to the display of image In+2, are acquired, column b comprising LEDs 1-b to 4-b is sequentially switched on by successive selection of rows 1 to 4. The light emitted by column b is reflected by the object OB toward the display screen and in particular toward the LEDs of rows 2, 3, and 4 because the object is located above LED 3-b and protrudes substantially over LEDs 2-b and 4-b. As a result, curve C3 of the voltage VCC, due to the light reflection by the object OB, has an even greater divergence with curve C1 (shown as a dotted line) when rows 2, 3, and 4 are activated. This therefore also means that curve C7 of the significant variations in the voltage VCC shows an increasing difference during the display of row 2, a greater divergence at the end of the display of row 3, and a slight additional divergence with respect to the preceding divergence during the display of row 4.

Finally, when the measurements of curve C4 are acquired, column a with LEDs 1-a to 4-a is switched on. The light emitted by column a is slightly reflected by the object OB toward the display screen because the object protrudes substantially over LED 3-a. Additionally, rows 3 and 4 received electrical charges when row 3 is displayed, in particular LED 3b. Rows 3 and 4 therefore receive less energy from the power source at the voltage VCC. This results in the curve C8 having a slight divergence between the signal depicted by curve C4 and the signal depicted by curve C1 during the display of rows 3 and 4. The comparison of the divergences of signals belonging to the same section L1 to L4 between curves C1 to C4, as illustrated by curves C5 to C8, make it possible to deduce that the object OB is over LED 3b, since a very large variation in power consumption is observed when this LED is switched on. Likewise, the consumption variation observed in section L3 of curve C2 makes it possible to know that the object OB protrudes substantially over LED 2-c, the variations observed in sections L2 and L4 of curve C3 make it possible to know that the object protrudes substantially over LEDs 2-b and 4-b, and the variation observed in section L3 of curve C4 makes it possible to know that the object protrudes substantially over LED 3-a.

The method of the invention, in order to be implemented, therefore implies that the variations in the overall voltage VCC at the terminals of the display matrix are analyzed for rows of the same rank of each displayed image, herein a simple line of LEDs moved from column to column. In the foregoing simplified example, sections L1 (activation of row 1) of curves C1 to C4 are therefore compared with each other, sections L2 (activation of row 2) of these curves are compared with each other, sections L3 (activation of row 3) of these curves are compared with each other, and sections L4 (activation of row 4) of these curves are compared with each other. As a result, in the case wherein a voltage converter ADC is used as shown in FIG. 1, the sampling frequency must be at least equal to the row selection frequency, but preferably greater than or even much greater than same, without which it would be difficult to distinguish the variations in consumption of the display matrix upon each activation of a row of the same rank of one image and of the subsequent images.

In practice, to acquire each measurement of power consumption making it possible to acquire each section L1 to L4 of power consumption curves C1 to C4 (with a sampling step that can be more or less fine), each of images In to In+3 is preferably displayed several times on the screen, preferably at least twice, before displaying the subsequent image. The acquisition of each measurement of power consumption for a display of a row of LEDs of the same image, and for each display of the image, is itself repeated several times, this number of times being a function of the sampling frequency. Series of power consumption values are therefore obtained.

For example, when the first image is displayed (FIG. 8A), when the first row is selected (section L1) the voltage VCC is measured several times, which makes it possible to acquire a series of values VL11, VL12, VL13, .... Likewise, when row 2 is selected (section L2), a second series of values is acquired: VL21, VL22, VL23, ..., and so on for each subsequent row of the same image. The same image is then refreshed (or displayed again) and the same measurement is repeated for each selection of rows 1 to 4 to obtain new series of values, for example VL11', VL12', VL13', ..., VL21', VL22', VL23', ..., and so on with each new display of the same image, before switching to display the subsequent image of FIG. 8B, etc. These series of values of the voltage VCC are then processed by statistical analysis or correlation, or by artificial intelligence, in order to eliminate various forms of noise in the measurement and determine the most likely power consumption value. Thus, for each row of each image displayed several times, a reference time sequence, for example VL11ref, VL12ref, VL13ref, ..., VL21ref, VL22ref, VL23ref, ... is obtained, for each section L1, L2, ... of the curve C1, C2, C3, or C4.

After this pre-processing (if necessary depending on the noise level) these reference time sequences undergo further processing, by statistical analysis or correlation, or by artificial intelligence, to obtain the image signal of the object. This processing is based on an analysis of the variations in the supply voltage from one image to the subsequent image.

In one embodiment, the step of acquiring reference time series is not carried out explicitly and overall processing of the series of sampled values VL11, VL12, VL13, ..., VL11', VL12', VL13', ..., VL21, VL22, VL23, ..., VL21', VL22', VL23', ..., is carried out directly, by statistical analysis, correlation or artificial intelligence, making it possible to deduce the variations in the supply voltage from one image to another and to obtain the image signal of the object.

In one embodiment, an artificial intelligence model is constructed based on the analysis of several images under determined conditions (training). This model then makes it possible to analyze variations in the supply voltage when one or more images are subsequently captured.

As indicated hereinbefore, the method of the invention is an application to a display screen of methods used in the field of auxiliary-channel-based analysis, making it possible to determine the value of a cryptographic key from the acquisition of several power consumption values of an integrated circuit. Conventional methods of statistical analysis, correlation or artificial intelligence developed in recent years to conduct auxiliary-channel-based analyses are used herein, not to determine the value of a cryptographic key as a function of its influence on the power consumption of an integrated circuit, but to construct the image signal of the object based on its influence on the power consumption of an LED display screen.

This analysis of power consumption variations by the processor PRC requires the latter to receive the synchronization signal FR indicating the start time of the display of each image. By analogy, auxiliary-channel-based analysis methods also require knowing the instant at which a cryptographic computing operation is engaged, without which the analysis of the variations in the consumption of an integrated circuit cannot allow these variations to be assigned to a hypothesis regarding the value of each bit of the secret key to be discovered. However, in the context of the present invention, other synchronization methods are possible and in particular a method described hereinafter in relation to FIG. 10.

Figure 9:
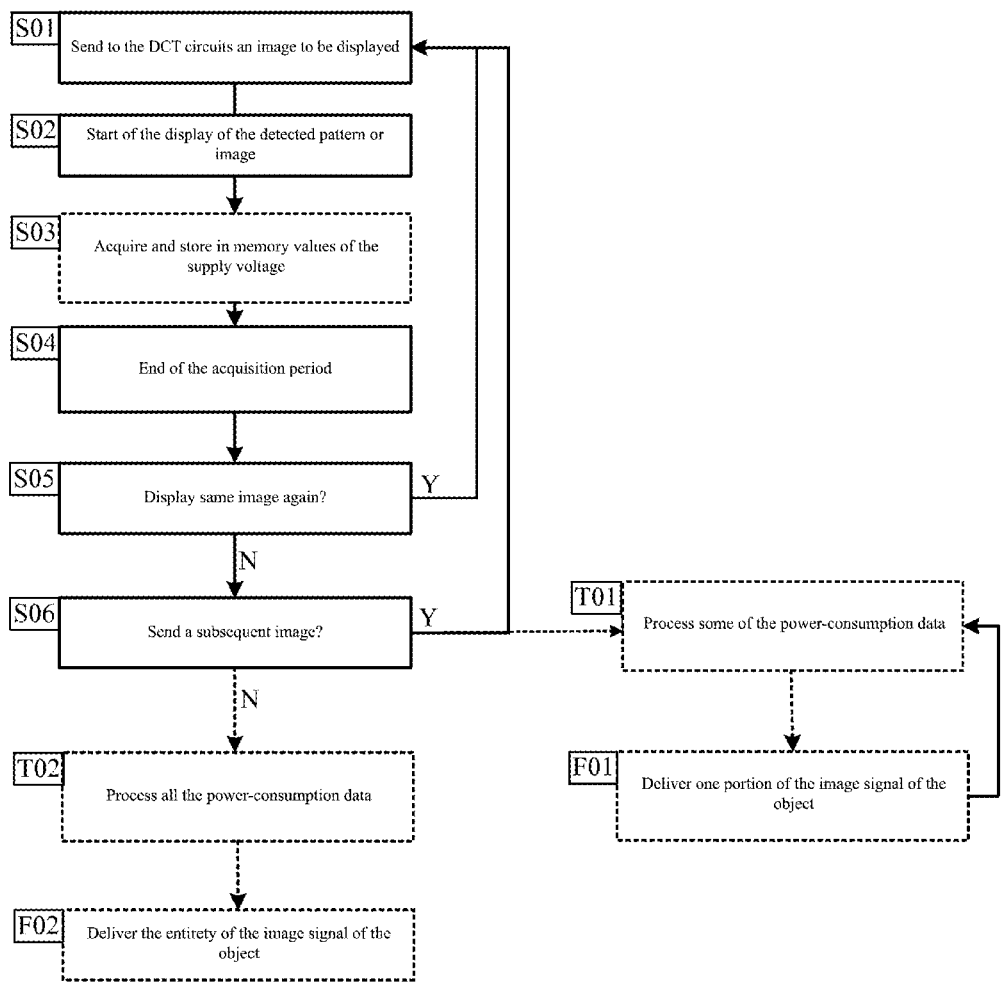
FIG. 9 is a flowchart showing one embodiment of the method of the invention.

FIG. 9 is a flowchart summarizing what has just been indicated and showing one embodiment of the method of the invention. The processor executes a program in which the basic parameters of the method have been predefined, namely the number of images to be displayed, the pattern assigned to each image, and the number of times each image must be displayed. For example, four images are required to display the four patterns depicted in FIGS. 8A to 8D, making it possible to perform a complete scan of the object. However, the method may also comprise only the display of the same pattern, as will be seen subsequently, when the object moves on the surface of the display screen or when a reference acquisition has been carried out beforehand.

During a step S01, the processor PRC sends the first image to the DCT control circuits of the display screen. During a step S02, the processor PRC detects the start of the display of the image, or the selection and the activation of the first row of the image by the DCT circuits, by means of the synchronization signal FR. Alternatively, the processor detects the start of the display of the pattern by detecting a synchronization code integrated into the image, as is described hereinafter in relation to FIG. 10. This latter method avoids acquiring voltage values that are not useful for generating the image signal of the object because the object is only located in the display zone of the pattern (the user being assumed to place the object in this zone).

During a step S03, the processor PRC acquires a plurality of values of the supply voltage VCC of the display screen during the display of a plurality of rows of the image (four rows in the example of FIGS. 8A to 8D), and stores these data in memory.

During a step S04, the processor PRC determines the end of the acquisition period. It may be the end of the display of the pattern assigned to the determined image, which may be known by counting the successively selected rows, or by counting the time needed to display this pattern. Indeed, it is not necessary for the processor to continue acquiring values of the supply voltage of the display screen beyond the display of the pattern.

During a step S05, the processor PRC determines whether it must display the same image again. If the response is positive, the processor returns to step S01 to send the image to the DCT control circuits again, and then repeats steps S02, S03, S04, and S05 to acquire and store in memory a new set of values of the supply voltage VCC of the display screen. If the response is negative, that is to say if the processor has already displayed this image N times, the processor executes a step S06 wherein it determines whether to send a new image to the DCT control circuits. If the response is positive, the processor returns to step S01 to send the new image to the DCT control circuits and then repeats steps S02, S03, S04, S05, and S06 to acquire and store, in each step S03, a new set of values of the supply voltage of the display screen.

It is then necessary to process, by statistical analysis, correlation, or artificial intelligence, this large amount of data, to obtain the image signal of the object. This processing can be done in real time or in deferred time. The real-time processing can be done with every new display of the same image. The real-time processing can also be done after having finished the N display cycles of the same image, during a step T01 which is executed when the processor, in step S06, observes that an image was sent N times and a subsequent image must be displayed. Thus, during step T01, the processor PRC processes the power-consumption data collected for each row of the image that has just been displayed multiple times, by statistical analysis, correlation, or artificial intelligence. However, this processing is preferably reduced to the rows that display the pattern, to avoid unnecessary computations. Then, during a step F01, the processor PRC delivers one portion of the image signal of the object in relation to the image that has just been displayed multiple times. Steps T01 and F01 are repeated after N displays of the subsequent image, and so on until the entire image signal has been delivered.

The deferred-time processing of the data can be done during a step T02 which follows step S06, when the processor knows that there are no new images to be sent to the DCT control circuits. In this case, the processing relates to the power-consumption data collected for each row of each image displayed multiple times (but preferably only the rows corresponding to the display of the patterns of the images), for each of the images having been displayed, and is, as previously, carried out by statistical analysis, correlation, or artificial intelligence. During a step F02, the processor PRC delivers in deferred time the image signal of the object in relation to all the images that have been displayed multiple times. It goes without saying that the real-time or deferred-time processing can also be carried out by another processor, which receives the power-consumption data collected by the processor PRC, for example an artificial intelligence module or a math coprocessor designed to execute this type of computation.

The method according to the invention can also be implemented by measuring the power consumption of the display matrix according to the embodiment of FIG. 2 or 3 of a device according to the invention. In this case, the current signals to be compared are in the form of current peaks, instead of in the form of curves of the voltage VCC. Such current peaks appear during the switching of the LED rows before their display, the amplitude of these peaks depending on the previously accumulated electrical charges, and thus on the light captured by the LEDs of these rows. These amplitude variations in the current peaks are compared in order to obtain amplitude variation curves which are similar to, or at least correlated with, curves C5 to C8 of variations in the voltage VCC, since they are caused by the same phenomenon. Likewise, using the embodiment of FIG. 4, the electromagnetic emission signal observed with every activation of a row and every display of an image has variation curves that are similar to or correlated with curves C5 to C8. It is also conceivable to combine several of these different types of measurement, while maintaining a frequency for sampling the power consumption and for analyzing variations in the power consumption that is at least equal to but preferably greater than or even much greater than the row-scanning frequency.

Additionally, although the object shown schematically in FIGS. 8A and 8D is a simple object comprising only a single outline, in practice the object of which the image signal is to be constructed in accordance with the method of the invention is a complex object comprising multiple constituent parts, for example a fingerprint profile. Each part of the complex object, for example each ridge of a fingerprint, is then equivalent to a simple object. Thus, the concept of "object" is not limited to a simple object and is understood to also cover a multiplicity of simple objects.

Likewise, the pattern displayed by each image for the implementation of the method may be simple or complex, and suited to the type of object to be imaged. It comprises at least one line of LEDs belonging to the same column, namely LEDs that belong to different rows and which are selected sequentially and successively.

A person skilled in the art will understand that, in a matrix of LEDs controlled row-by-row, a pattern that consists of one line of LEDs belonging to the same row should not, in principle, make it possible to implement the method, since all these LEDs would be switched on at the same time, so that it would not be possible to determine which LED or group of LEDs switched on caused a divergence in the consumption signal. For example, in FIGS. 8A to 8D, if all the LEDs of one row were switched on simultaneously, the acquired consumption signals would not make it possible to distinguish the individual contribution of each switched-on LED of the row. However, in a larger matrix, if this pattern were shifted from left to right and from right to left on the row, it would still be possible to detect the instant at which the pattern reaches the object to be detected and the instant at which the pattern goes past the object to be detected, so that the object could also be detected, but in a less optimal manner. It would then be advisable to perform a similar scan on all neighboring rows, to determine the limits of the object.

Additionally, the method of the invention can be implemented in a display matrix having individually controlled LEDs. In this case, the pattern may be any selected pattern, for example, formed by a line of LEDs of a same row or of a same column, activated sequentially.

In the case of a screen having a very high resolution with respect to the object to be detected, it may be contemplated to activate several LEDs of the same row at the same time, or even several LEDs covering the same row and covering several columns, considered as forming together a "macro-LED" of larger surface area, which leads to a reduction in the resolution of the image signal obtained. In one variant of the method, large "macro-LEDs" are used to rapidly locate the object, then the detection of the object in the identified zone is refined by gradually increasing the fineness of resolution or by passing directly to the maximum resolution on the scale of the LEDs.

According to other embodiments, the pattern presented in the series of images displayed during the acquisition of consumption measurements is shifted by one column every k images of the series of images, k being greater than or equal to 1. The shift direction can be to the left or to the right, indifferently, or alternate to the left and to the right. The pattern displayed may include several adjacent switched-on columns, especially when it is sought to increase the sensitivity of detection and the resolution of the display screen is greater than the sought detection resolution. The pattern may be made up of squares or rectangles of several LEDs, the squares or rectangles preferably being spaced apart from each other so as not to cover the same row of the display screen.

In the case of a color display matrix, each pixel of an image displayed by such a matrix can be made up of several LEDs of different primary colors. When the pattern displayed is in a primary color, only one LED of the primary color of each pixel of a line of pixels of the matrix can be activated. In this case, the term "two adjacent LEDs" refers to two adjacent LEDs of the same primary color, it being understood that LEDs having other primary colors can be arranged between the two adjacent LEDs of the same primary color.

By virtue of the measurements of consumption of the display device, the presence and the position of an object on the display screen can be determined. When the object covers several pixels of the display screen, these measurements make it possible to determine the shape and the relief of the object. By analyzing more finely the acquired consumption signals, and by comparing with a threshold the consumption divergences with and without an object present on the display screen, a black and white image of the object can be formed at a resolution corresponding to the width of an LED emitting zone, in the direction of the rows of the display screen, and corresponding to the width of the pattern displayed, scanning the display screen, in the direction of the rows of the display screen. Thus, a page of printed text placed against the screen can be scanned, knowing that the characters printed in black reflect very little light or none at all. Likewise, the fingerprint of a finger placed on the screen can be scanned, knowing that the grooves in the fingerprint are further from the screen than the bumps or are tilted with respect to the screen, and therefore reflect less light. Furthermore, the width of a fingerprint groove or bump is of the order of 500 μm and the resolution of current screens is currently less than 250 μm, the most recent display screens being able to achieve a resolution of 45 μm. Additionally, quantifying the amplitude of the measured consumption divergences can make it possible to determine several levels of consumption divergences, and thus form a grayscale image. The consumption signals acquired when an object is present on the surface of the display screen can be directly compared to one another by taking into account the LEDs that are active at the instants of acquisition of the signals, to determine an image of the object or of the relief thereof.

According to one embodiment, the display device is configured to display color images. In this case, the capture images displayed during the acquisition of consumption signals can have a pattern of switched-on LEDs of a certain color. The color for the pattern of switched-on LEDs LD can be selected so as to offer better sensitivity for the detection and production of an image of the object OB present on the surface of the display screen. The color of the displayed pattern can also be selected as a function of the object to be detected. Thus, the color yellow, and to a lesser extent, the color red, make it possible to maximize the reflection of the light emitted by the display screen in order to detect a fingerprint.

By displaying several series of images with patterns of different colors, for example primary colors, it is possible to form an image of the object in each primary color, these images then being able to be combined to then form a color image of the object.

In one embodiment, the capture zone of the display screen is reduced to a set of adjacent rows of LEDs. In this case, the processor PRC is configured to extract acquired consumption signals, the portion of the signals corresponding to the capture zone, or to capture only the signals corresponding to the capture zone.

In another embodiment, the processing of the consumption signals is carried out by the processor PRC using an artificial intelligence module configured by training using a large number of consumption signals acquired in different conditions of series of displayed images, in the absence of an object on the surface of the display screen and in the presence of such an object in different positions on the display screen. The consumption signals used for training the artificial intelligence module can also be acquired in different ambient lighting situations of the display screen.

In another embodiment, a synchronization signal making it possible at any instant to determine the position of the switched-on LEDs is generated by displaying one image having a predefined pattern, distributed over one or several predefined columns. The analysis of the consumption signal by the processor PRC aims to find the predefined pattern. Knowing the position of the pattern in the image, the processor PRC can then determine the start of each image of the series of images having the predefined pattern, without needing the previously described synchronization signal FR. This arrangement can be implemented when the signal FR is not delivered by the DCT control circuits of the display device.

Figure 10:
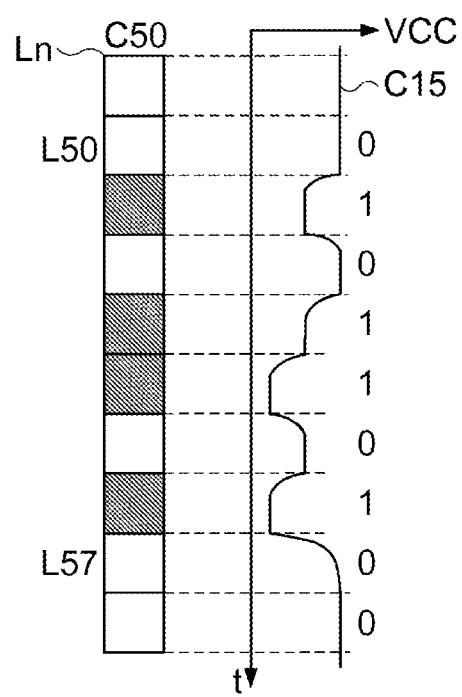
FIG. 10 depicts an example of a pattern displayed in correlation with a consumption signal of the display device.

FIG. 10 depicts an example of a pattern displayed to allow the processor PRC to synchronize the consumption signals received with the displayed images. In this example, the displayed image is an image in which all the LEDs LD are off, except for the LEDs located on a column C50 of the image and on rows L51, L53, L54, and L56. FIG. 10 also shows a curve C15 of variation in the consumption signal of the display device during the display of rows L50 to L58, this signal being a signal of variation in supply voltage VCC as a function of time, acquired by the processor PRC in the apparatus of FIG. 1. The analysis of the consumption signal aims to detect the binary sequence 010110100, 0 and 1 corresponding to an LED that is off and on, respectively. When the processor PRC detects this binary sequence in the consumption signal, LED 57 of column C50 of the image being displayed has just been displayed. Knowing the display time of an image row, the processor PRC can thus determine the start time of the display of the first row of each image or else locate a zone to be scanned.

It will be apparent to those skilled in the art that the present invention is capable of various other alternative embodiments and applications. In particular, the LED matrix may only have a single row. It is indeed possible to use a single line of LEDs for example to scan a barcode printed in black and white. It is also possible to generate an image of an object, for example using an array of LEDs controlled by a group of at least one LED so as to successively activate at least part of the LEDs of the array, the array being moved with respect to the object. Thus, the consumption signals acquired include components resulting from the light reflected by the object and captured by the switched-off LEDs of the array, as well as the conductive traces connected to the LEDs of the array. Therefore, the consumption signals coming from such an array of LEDs can be equivalent to those delivered by the previously described display screen.

The invention is not limited to the display of a series of different images, that is to say having different patterns. In one embodiment, the pattern displayed on the display screen is stationary, while the object is moved in front of the pattern, it being understood that all the LEDs forming the pattern may not be switched on at the same time, but can be switched on successively to increase the resolution of the image obtained of the object, taking into account especially the light reflected by the object and captured by the switched-off LEDs and the conductive traces connected to these LEDs. Thus, with each new image or with every "N" images displayed, significant variations in voltage VCC, current or electromagnetic signals are obtained, linked to the movement of the object with respect to the displayed pattern.

It is no longer necessary for the pattern to be shifted by one or more columns with every image of the series of images. It is simply important for the respective positions of the switched-on LEDs in each image of the image series to be known.

In one embodiment, the acquisitions of the consumption signals for each selection of a row are simply compared with reference measurements previously stored in memory, especially in the context of a fingerprint authentication. The reference measurements can be obtained by placing a finger of an authentic user in the light beam at different positions on the display screen or by scanning the finger with the light beam in different directions. This also means that the power consumption signal measurements themselves constitute an image signal that can be processed to constitute an actual image.

A matrix of LEDs used to implement the method of the invention is not necessarily managed so as to display images row-by-row, all the pixels of one row being displayed simultaneously. This management mode depends on the architecture of the display matrix. It goes without saying that other management modes can be contemplated. Thus, some display matrices can be controlled pixel-by-pixel. In this case, it is possible to determine the contribution of each emitting zone of the matrix to each consumption measurement.

The invention claimed is:

1. A method for generating an image signal of an object by means of a display device including a display screen comprising light-emitting diodes arranged in rows and columns, the method comprising:

by means of the display screen, displaying a series of images (In–In+3) each representing one respective pattern, the display of each pattern causing the activation of at least one LED of the display device and leading to the emission of a light beam that may be identical or different to the preceding light beam depending on whether the displayed pattern is identical or different to the pattern of the preceding image, acquiring a plurality of measurements of the power consumption of the display device during the display of each image (In–In+3), acquiring a plurality of measurements of the variations in the power consumption of the display device, each measurement of a variation in the power consumption being representative of a divergence between a measurement of the power consumption of the display device during the display of an image and a measurement of the power consumption of the display device during the display of a preceding image of the series of images (In–In+3), and wherein the measurements of the power consumption of the display device are synchronized with the successive selection of LEDs during the display of each image of the series of images (In–In+3).

2. The method according to claim 1, wherein the acquisition of each measurement of the power consumption of the display device during the display of an image (In–In+3) comprises the acquisition of a plurality of measurements of power consumption by displaying the same image several times, and the acquisition of the plurality of measurements of the variations in the power consumption is carried out by mathematical computation or artificial intelligence based on the plurality of measurements of power consumption obtained for each image displayed several times.

3. The method according to claim 1, wherein each image of the series of images (In–In+3) represents the same pattern or, in an equivalent manner, the series of images comprises only one image, the light beam being invariable, comprising the step that consists in scanning the surface of the object by moving the object with respect to the light beam.

4. The method according to claim 3, wherein the display of each image comprises successively selecting groups of LEDs each comprising at least one LED, and wherein the measurement of the variations in the power consumption of the device is obtained by comparing its power consumption when one group of LEDs is selected for a first position of the object, with its power consumption when the same group of LEDs is selected for subsequent positions of the moving object, and this for each group of LEDs selected when an image is displayed.

5. The method according to claim 1, wherein each image of the series of images (In–In+3) represents a different pattern, to vary the light beam, the object being stationary with respect to the display device.

6. The method according to claim 5, wherein the display of each image and of a pattern assigned to the image comprises the successive selection of groups of LEDs each comprising at least one LED, and wherein the measurement of the variations in the power consumption of the device is obtained by comparing its power consumption when each group of LEDs is selected during the display of an image, with its power consumption when another group of LEDs is selected during the display of a preceding image, and so on for each subsequent image, the groups of LEDs selected for which the variations in the power consumption of the device are measured from one image to another being groups of the same rank according to a predetermined order of selection of the LEDs when each image is displayed.

7. The method according to claim 1, wherein the series of images (In–In+3) represents the same pattern or, in an equivalent manner, the series of images comprises only one image, the generation of the image signal of the object comprises steps that consist in determining divergences in power consumption by subtracting from each measurement of power consumption a respective reference measurement acquired in the absence of an object in the light beam, and the measurement of the variations in the power consumption of the device is obtained by comparing its power consumption when one group of LEDs is selected in the presence of the object, with its power consumption when the same group of LEDs is selected in the absence of the object.

8. The method according to claim 1, wherein the object is a fingerprint profile.

9. The method according to claim 1, wherein the object is a fingerprint and the display of each image and of a pattern assigned to the image comprises the successive selection of groups of LEDs each comprising at least one LED, and wherein each image of the series of images (In–In+3) represents the same pattern or, in an equivalent manner, the series of images comprises only one image, the method comprising a step of storing in memory the power consumption of the display screen when each group of LEDs is activated in the presence of the fingerprint of an authentic user, then a step of comparing with the power consumption stored in memory the power consumption of the display screen when each group of LEDs is activated in the presence of a fingerprint to be authenticated.

10. The method according to claim 1, wherein the measurements of signals representative of variations in the power consumption of the display device are acquired according to one or the other of the following methods or a combination thereof:

measuring a power supply voltage of the display device,
measuring an intensity of a supply current of the display device,
measuring an intensity of a current passing through a ground connection of the display device,
measuring electromagnetic radiation emitted by the display device or display screen.

11. The method according to claim 1, wherein the images (In–In+3) of the series of images are displayed row-by-row of LEDs, the LEDs of one row being activated simultaneously to display a row of images, the method comprising steps that consist in measuring the variations in the power consumption of the display device for each row of an image of the series of images displayed, from a synchronization signal transmitted at the start of the display of each image of the series of images, or upon detecting a particular pattern in the acquired signal measurements, the particular pattern being located in a defined position in each image of the series of images.

12. The method according to claim 1, wherein the acquisition of the measurements of power consumption variation signals of the display device is limited to a set of LEDs corresponding to only one portion of the screen.

13. The method according to claim 1, comprising a step of selecting a color of an LED to display the pattern or patterns of the series of images (In–In+3).

14. An apparatus comprising a display device, a processor connected to the display device, and a member for acquiring measurements of signals representative of the power consumption of the display device, the acquisition member being connected to the processor, the processor being configured to implement the method according to claim 1.

15. The apparatus according to claim 14, wherein the member for acquiring measurements of signals representative of power consumption comprises at least one of the following means:
- a link connected to a power terminal of the display device and to an input of an amplifier,
- a resistor mounted in series on a supply link connected to the power supply terminal of the display device, and a differential amplifier connected to the terminals of the resistor,
- a resistor inserted between a terminal for connecting the display device to a ground of the apparatus and the ground of the apparatus, and an amplifier connected to the ground connection terminal,
- an electromagnetic probe placed in the vicinity of an LED matrix of the display device, the probe being connected to a differential amplifier.

* * * * *